Figure 1:
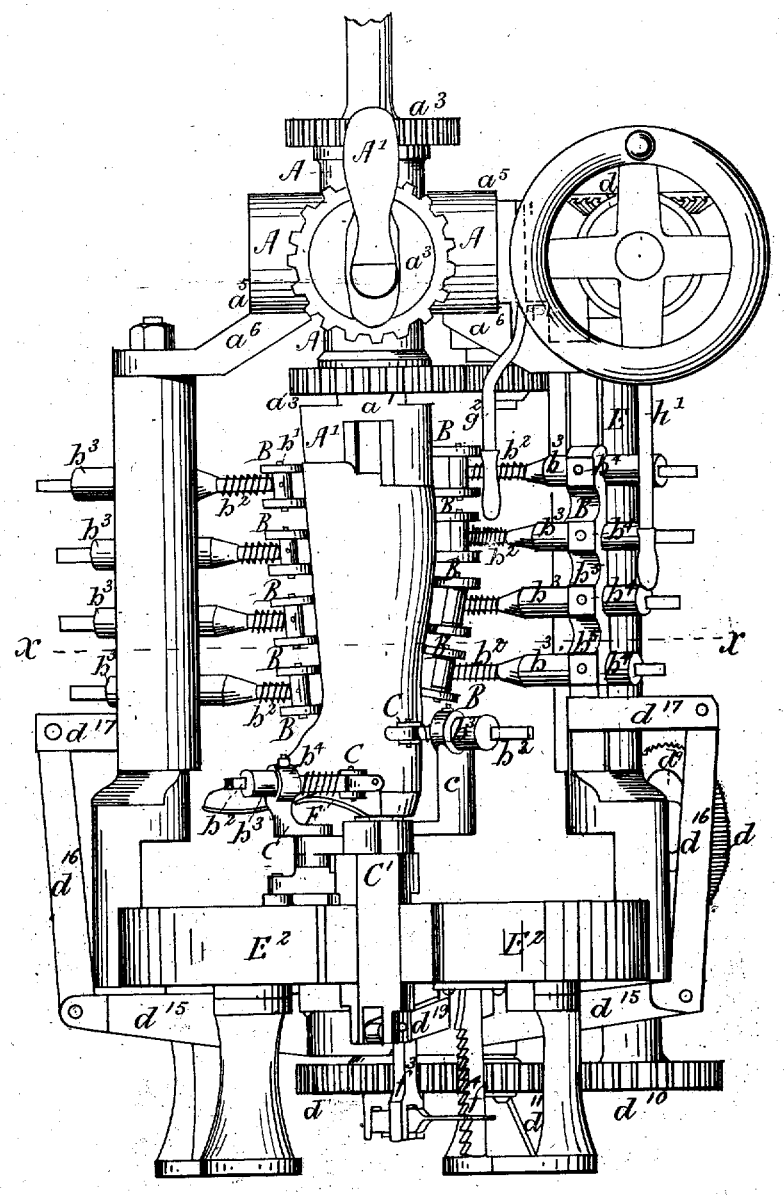

5 Sheets—Sheet 1.

J. E. CRISP,

Assignor to G. W. COPELAND, Trustee.

Boot-Treeing Machine.

No. 9,055. Reissued Jan. 20, 1880.

WITNESSES

G. G. Raymond 2d

M. W. Sawyer

INVENTOR

J. E. Crisp

J. E. CRISP,

Assignor to G. W. COPELAND, Trustee.

Boot-Treeing Machine.

No. 9,055. Reissued Jan. 20, 1880.

WITNESSES—
D. D. Raymond 2d
M. W. Sawyer

INVENTOR
J. E. Crisp

5 Sheets—Sheet 3.
J. E. CRISP,
Assignor to G. W. COPELAND, Trustee.
Boot-Treeing Machine.
No. 9,055. Reissued Jan. 20, 1880.
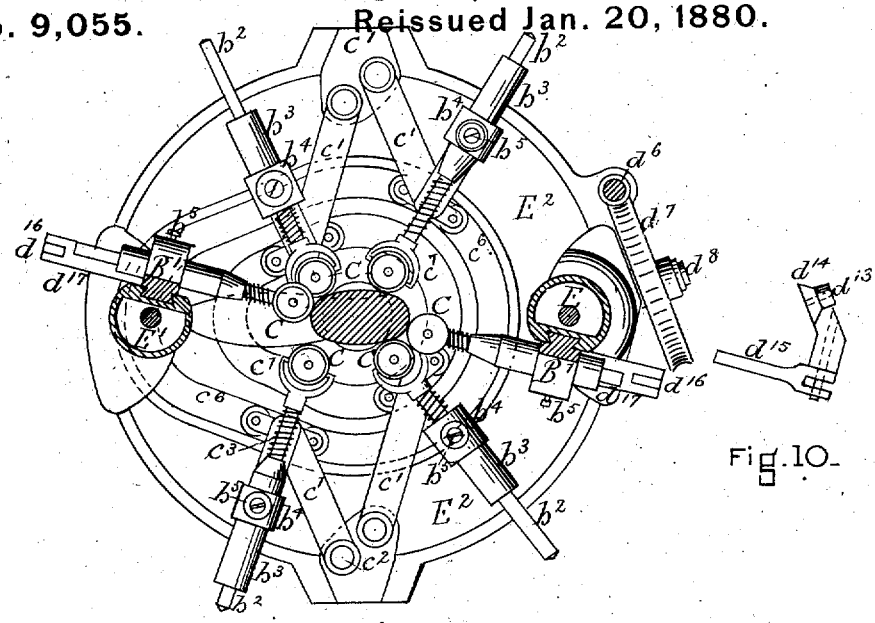
Fig. 10.
Fig. 4.
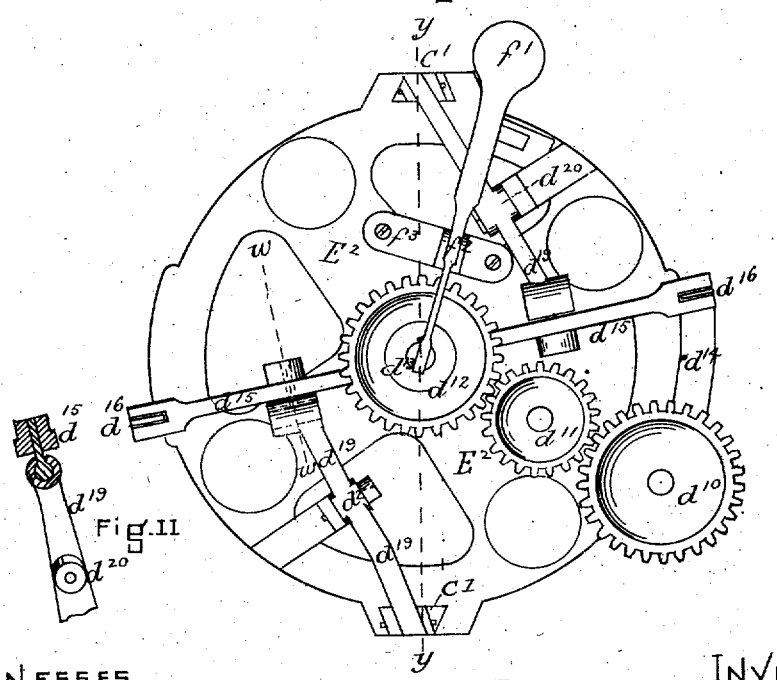
Fig. 11
Fig. 5
WITNESSES
O. G. Raymond 2d
M. H. Sawyer
INVENTOR
J. E. Crisp

J. E. CRISP,

Assignor to G. W. COPELAND, Trustee.

Boot-Treeing Machine.

No. 9,055. Reissued Jan. 20, 1880.

WITNESSES
D. D. Raymond 2d
M. W. Sawyer

INVENTOR
J. E. Crisp

J. E. CRISP,

Assignor to G. W. COPELAND, Trustee.

Boot-Treeing Machine.

No. 9,055. Reissued Jan. 20, 1880.

WITNESSES
D. T. Raymond 2d
M. H. Sawyer.

INVENTOR
J. E. Crisp.

UNITED STATES PATENT OFFICE.

JOSEPH E. CRISP, OF BOSTON, ASSIGNOR TO GEORGE W. COPELAND, TRUSTEE, OF MALDEN, MASSACHUSETTS.

BOOT-TREEING MACHINE.

SPECIFICATION forming part of Reissued Letters Patent No. 9,055, dated January 20, 1880.

Original No. 221,786, dated November 18, 1879. Application for Reissue filed December 22, 1879.

*To all whom it may concern:*

Be it known that I, JOSEPH E. CRISP, of Boston, in the county of Suffolk, in the Commonwealth of Massachusetts, have invented an Improvement in Boot-Treeing Machines, of which the following is a specification.

This invention relates to an improvement in boot-treeing machines, whereby the entire boot may be automatically fitted, smoothed, and finished upon the boot-tree, or "treed," as it is technically termed, simultaneously.

It embraces, first, means for smoothing and finishing the boot upon the boot-tree in parallel sections extending around the tree at right angle to the axis of its revolution; second, a jack or other suitable mechanism for holding the boot-tree and for presenting it to the fitting, smoothing, and finishing rolls; third, means for continuously rotating the boot-tree upon its longitudinal axis; fourth, a series of fitting, smoothing, and finishing rolls arranged in one or more lines parallel with the axis of revolution of the tree, and adapted to be held against the surface of the boot-tree, or the boot upon the tree, at a constant pressure; fifth, means for automatically adjusting the series of rolls, which are arranged to operate upon the foot portion of the tree in such a manner that as the tree revolves the devices for supporting the rolls maintain the same relative angle in relation to every portion of the surface of the foot brought in contact with them; sixth, means for providing the rolls with a traversing movement lengthwise of the tree, or at right angle to its line of rotation; seventh, the specific arrangement and combination of the various operative and connecting portions of the machine.

Heretofore it has been customary, in boot-treeing machines, to reciprocate the smoothing and finishing pad or roll lengthwise of the tree—that is, between the heel portion and the knee—as illustrated in the patent granted me on the 20th day of May, 1879; or to use a reciprocating tool which moves in substantially the same plane, and a boot-tree adapted to be revolved by hand in presenting successive longitudinal sections of the boot-leg to the tool, as shown in the patents granted Ethridge, June 11, 1878, and January 29, 1879; or to use a reciprocating rub-stick, which also moves between the knee portion of the tree and the foot in substantially the same plane, and a revolving boot-tree, as shown and described in the patent to Comey of March 5, 1878; or a smoothing and finishing roll provided with a reciprocating and traversing movement upon a stationary tree, as shown in my pending application filed August 27, 1879. Neither of these inventions, however, is intended to automatically tree the entire boot-leg and foot simultaneously, and neither of them employs a constantly-revolving boot-tree and devices which operate upon parallel sections around the tree, instead of lengthwise, by the revolving movement of the tree in relation to the tools.

Figure 2:
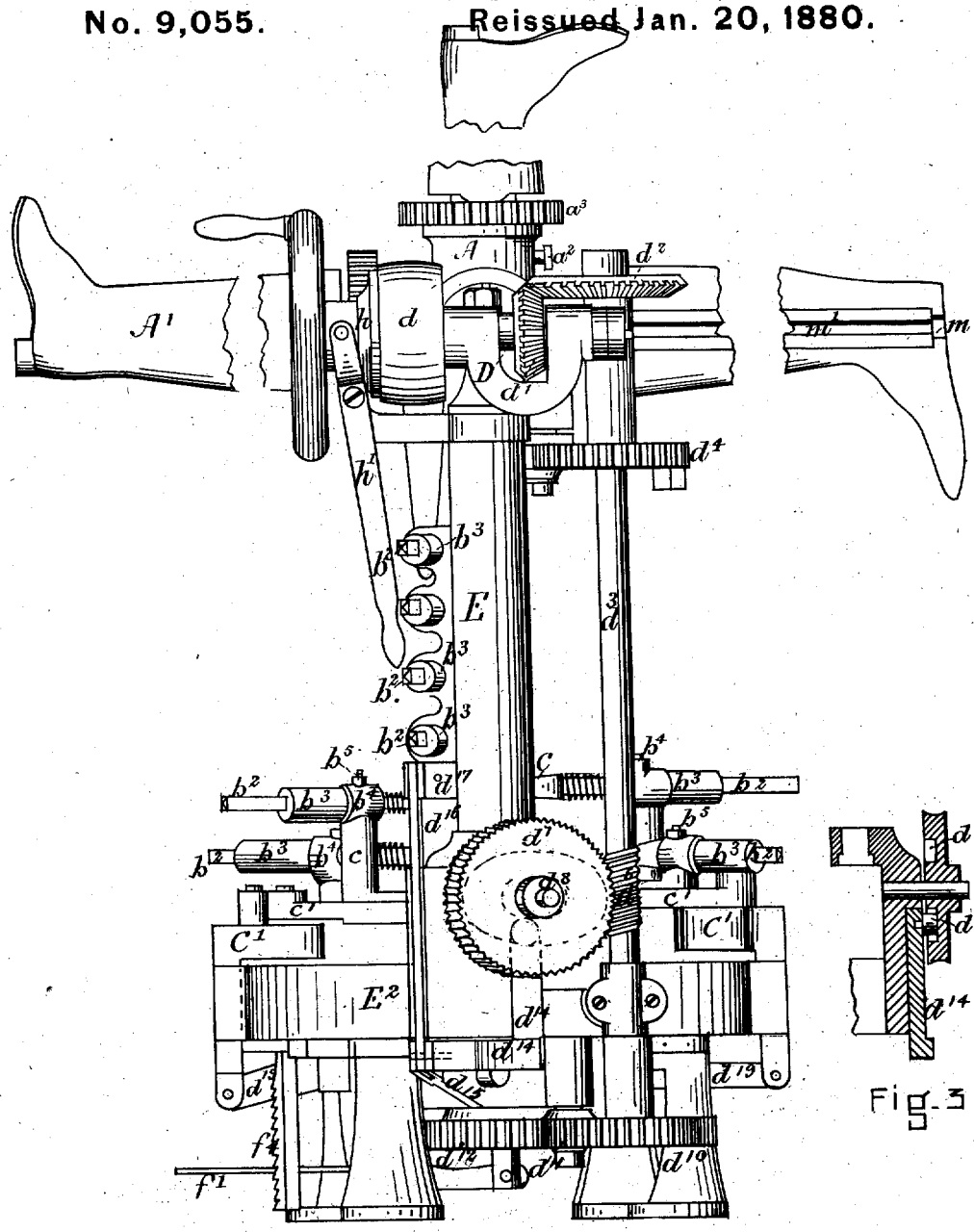
Figure 3:
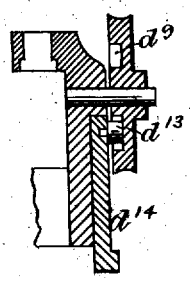
Figure 6:
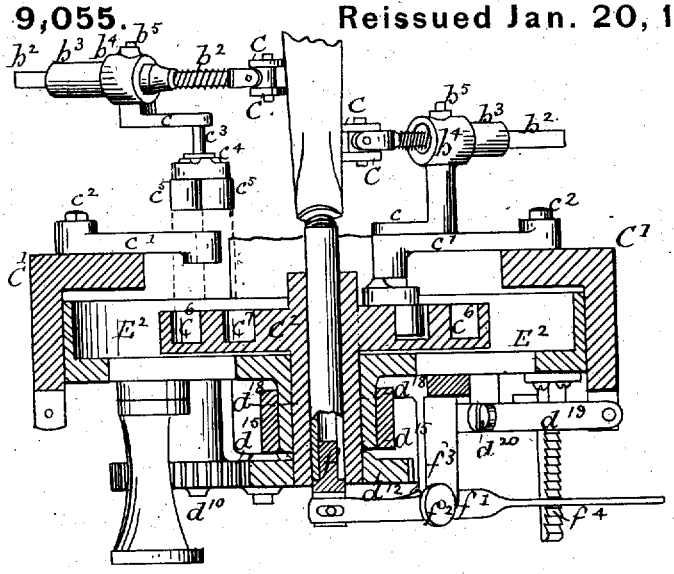
Figure 7:
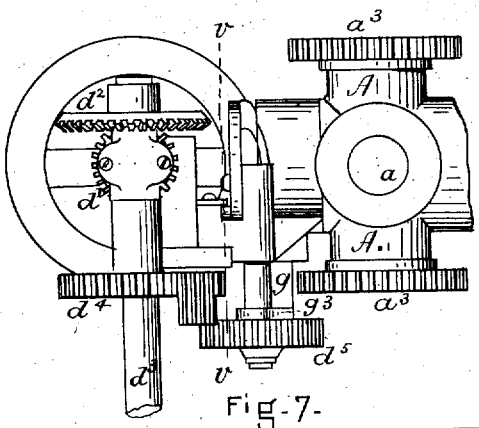
Figure 8:
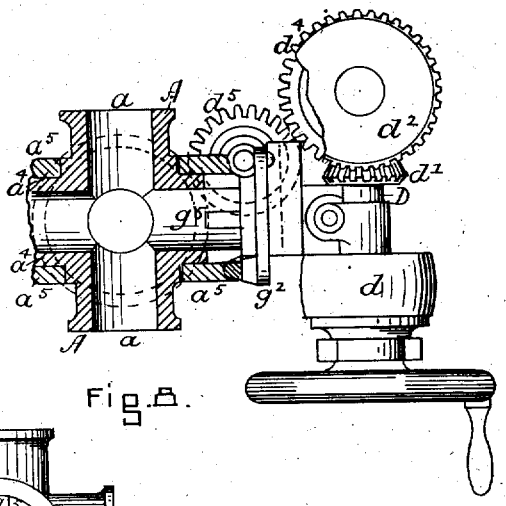
Figure 9:
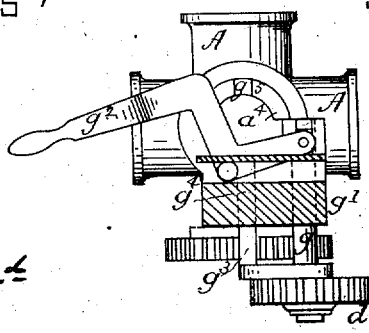
Figure 12:
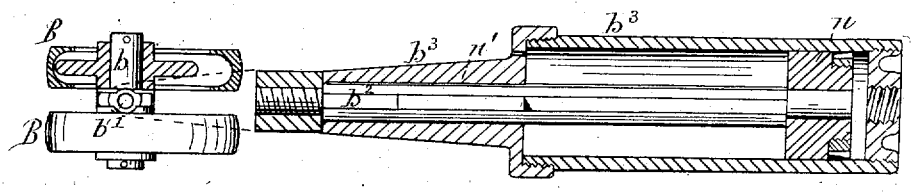

In the drawings which accompany this specification and form a part thereof, Figure 1 is an elevation illustrating the front portion of the machine. Fig. 2 is an elevation representing one side of the machine to the right of the front portion. Fig. 3 is a detail view, representing a detail in the construction to be hereinafter described. Fig. 4 is a plan and horizontal section upon the line *x x* of Fig. 1, and illustrates the method of operating the rolls which work upon the foot portion or upper of the boot. Fig. 5 is a plan of the under surface of the machine inverted. Fig. 6 is a vertical section on the line *y y* of Fig. 5, with one of the rolls for operating upon the foot detached for the purpose of representing the manner in which it is held. Fig. 7 is an elevation of the left-hand portion of the back of the machine. Fig. 8 is a view, in plan, of the same portion of the machine. Fig. 9 is an elevation and section on the line *v v* of Fig. 7. Figs. 10 and 11 illustrate details hereinafter described. Fig. 12 represents a method of providing the rolls with a yielding movement against a cushion of compressed air contained in a cylinder; and Fig. 13, a roll, its holding device, and cylinder.

The jack A, for holding the boot-tree A′, is provided with a series of sockets, *a*, for the reception of the knee end of the boot-tree, which is adapted to fit therein, and as it is intended that the boot-tree shall be revolved, it is provided with a circumferential groove, into which the end or point of a locking-screw, $a^2$, projecting from the socket enters. This construction enables the boot-tree to be securely fastened to the jack, and also to be revolved. The boot-tree is further provided with a gear-wheel, $a^3$, upon its upper or knee end. The jack is adapted to be revolved vertically upon its trunnions or arms $a^4$, which have a bearing in the sockets $a^5$ upon the frame $a^6$.

For convenience, the fitting, smoothing, and finishing rolls may be divided into two series—viz., those operating upon the leg portion of the boot-tree and those operating upon the foot portion.

As the exterior surface of the leg part of a boot-tree is approximately parallel with its axis, I can employ upon this portion of the boot-tree the rolls B, having simply a yielding and slight traversing movement at right angle to the line of rotation of the boot-tree.

I prefer that the axes of the rolls should be substantially parallel with the axis of the tree; and in order to effect this I arrange the rolls in pairs upon a shaft, $b$, and this shaft may have a spindle, $b'$, which extends at right angles from its longitudinal center and swivels in arms projecting from the holding-rod $b^2$; or it may be connected with the holding-rod by a ball-and-socket or equivalent joint, or in any other way which will allow the shaft supporting the rolls to have a movement which will allow it to change its inclination to conform to that portion of the boot-tree upon which it operates. As many lines or series of rolls may be used upon the boot-tree as desired.

The rods $b^2$, carrying the rolls, are supported in the blocks $b^3$, in which the rods are arranged to move, as hereinafter described. Each of these blocks is adjustably fastened to its respective carriage $d'$ by means of the socket $b^4$ and the locking-screw $b^5$.

The rolls may be arranged to be kept in contact with the surface of the boot-tree, or with the boot thereon, by any suitable spring-pressure; but I prefer to use compressed air introduced into a cylinder, which becomes the supporting-block behind a piston upon the roll-supporting rod. As the manner in which compressed air is used for this purpose is well known, it is not necessary for me to further describe the construction of such parts as relate to its use in this connection. Any equivalent power for maintaining the rolls in yielding contact with the boot-leg upon the boot-tree may be used.

The blocks $b^3$ are laterally adjustable in their sockets. The rolls C are adapted for use in fitting, smoothing, and finishing the foot portion of the boot upon the boot-tree, and they are held at the end of rods arranged to yield in their supporting blocks or cylinders upon contact with the boot-tree. As the foot portion of the tree projects from the leg portion a considerable distance, it is necessary to provide the cylinders or blocks holding the roll-supporting rods with such movement coincident with that of the foot portion of the boot-tree as shall permit the rolls to be always properly presented to the tree. For this purpose the sockets holding the blocks or cylinders are each supported by an upright post upon the arm $c$, which is pivoted at its inner end to the link $c'$, which, in turn, is pivoted to the block C' at $c^2$. The pivot $c^3$, upon which the socket-supporting arm $c$ swings, passes through the end of the link $c'$ into the block $c^4$, which carries the two cam-pins $c^5$. The block $c^4$, pivot $c^3$, and lever $c$ are, in every instance, rigidly united. The cam-pins $c^5$ may be provided with anti-friction rolls. Two cam-grooves in the revolving disk $C^2$ adjust the position of the blocks or cylinders holding the roll-supporting rods in relation to the axis of the tree, and maintain their proper angle in relation to the surface of that portion of the foot upon which the rolls bear.

The cam-groove $c^6$ adjusts the lower set of rolls, or that set which operates upon the portion of the foot below the instep, and the cam-groove $c^7$ the set which operates upon and above the instep. The foot-rolls C are also provided with a traversing movement lengthwise of the last.

Although one line of rolls may be employed, I prefer to use two or more opposing sets, to maintain equal and uniform pressure upon the boot-tree from both sides, by which it is steadied in its revolution, and also for the purpose of enabling the work to be done more quickly.

By employing two cam-pins instead of one, each arm $c$ is rigidly held, so that while it obeys each change in the pattern or cam it does not swivel therein, and the rolls are constantly kept in contact with the boot upon the boot-tree, the cam-grooves operating to move the blocks or cylinders carrying the rods supporting the rolls outwardly or inwardly, as the distance between that portion of the foot being operated upon and the axial center of the boot-tree increases or decreases as it is revolved.

It will be observed that in this invention the boot-tree presents the boot-leg to yielding rolls, which operate upon the boot-leg only upon the movement of the tree part, and that each roll operates upon a certain section at right angles to the line of rotation of the boot-tree or around it, as distinguished from lengthwise of it, and that the rolls, having an interval of space between them, are provided with a traversing movement which allows them to fit the intervening sections, and even to lap upon the portion previously fitted by the next adjacent roll, and that, if desirable, one set of rolls may traverse in a direction opposite to that of the other set.

It will further be observed that the rolls which operate upon the foot portion must have, in addition to the yielding movement, a movement of the blocks or cylinders carrying the roll-supporting rods such as described.

I consider the features above described to be the essential elements of my invention.

The mechanism for effecting the rotation of the jack, the traversing movements of the carriages and blocks which support the rolls, and the rotation of the cam will now be described.

The short shaft D has a bearing in suitable brackets upon the post E, and is arranged to be driven by the pulley $d$. It carries a bevel-gear, $d'$, which meshes with the bevel-gear $d^2$ upon the upper end of the vertical shaft $d^3$, and it is also provided with the spur-wheel $d^4$, which, through the intermediate spur-wheel, $d^5$, and the gear-wheel $a^3$, revolves the boot-tree. The shaft $d^3$ is further provided with a worm, $d^6$, which operates the worm-wheel $d^7$. This worm-wheel has a bearing upon a stud, $d^8$, projecting from the post E, and has a cam, $d^9$, upon its inner face. The shaft $d^3$ carries at its lower end the spur-gear $d^{10}$, which, through the intermediate gear $d^{11}$ and the gear $d^{12}$ upon the lower end of a short shaft, revolves the cam-disk carrying the pattern-cams $c^6$ $c^7$, and also the tree-support F.

The cam $d^9$, by means of the cam-pin $d^{13}$, sliding bar $d^{14}$, lever $d^{15}$, and links $d^{16}$, which connect each end of the lever with the arms $d^{17}$, projecting outwardly from the carriages B′, provides the same with a slow traversing movement in the posts E E′. The lever $d^{15}$ is pivoted to the post $d^{18}$, which projects downwardly from the horizontal portion $E^2$ of the frame of the machine, the lever being arranged to straddle the post. This arrangement of levers moves the carriages B′, and consequently the rolls which they support, in opposite directions, so that one set of rolls which operate upon the leg portion of the tree is moving toward the knee with each revolution of the boot-tree, while the other set is moving toward the foot portion, and this movement continues for one quarter-revolution of the cam $d^3$, when it is reversed.

In order to provide the blocks C′ and the links $c'$ and the devices for holding the foot-rolls with a vertical movement, I connect the lower portion of each of the blocks and the lever $d^{15}$ by a lever, $d^{19}$, which is pivoted at $d^{20}$ to a bracket projecting downwardly from the plate $E^2$.

It will be observed that these levers $d^{19}$ are so arranged that the two blocks are moved in opposite directions corresponding with the movement of the carriages, so that the two sets of rolls which operate upon the foot portion of the boot-tree are provided with a traversing movement one-half in extent, but corresponding in direction, to that given those operating upon the leg portion of the trees.

To prevent too severe a strain upon the screw and groove by which the boot-tree is secured to the jack on account of the weight of the tree and the pressure upon it, I arrange the support F to bear upon the sole of the boot, and I provide it with a vertical movement by means of the rod $f$, upon which it is supported, and which passes through a hole in the cam-disk, and the spring lever or treadle $f'$, depending from the frame $E^2$, and lock it by means of the rack or notches $f^4$, with which the edge of the treadle is adapted to engage, or in any other desirable way.

In order to revolve the jack for the purpose of removing one tree and adjusting the next succeeding, the intermediate gear $d^5$ is provided with a vertical movement to disengage it from the gears $d^4$ and $a^3$. This is effected by providing the spindle $g$, upon the lower end of which the said gear-wheel $d^5$ revolves, with a vertical movement in the block $g'$ by means of the bent lever $g^2$, or in any other suitable manner. The spindle $g$ also carries a bolt, $g^3$, which is arranged to slide in the hole $g^4$ in the block $g'$, and which locks the jack into position by shutting into the recess $g^5$ upon the arm or trunnion. The downward movement of the spindle, therefore, not only disengages the gear-wheel $d^5$, but also unlocks the jack, while its upward movement engages the gear-wheel with the other wheels of the train and fastens the jack.

The clutch $h$ may be arranged upon the shaft D, to engage with the pulley $d$, in which case it is fastened to the shaft by a fast feather, to revolve therewith, and it is provided with a movement thereon to and from the pulley, which has a loose bearing upon the shaft, by means of the lever $h'$. Any desirable construction and shape of clutch may be used.

In operation, the boot is adjusted upon one of the horizontal boot-trees and stretched, and, if desired, the filling and finishing compositions applied. The jack is then revolved, bringing the boot-tree into position in relation to the smoothing and finishing rolls and locked, and the machine set in motion. The boot-tree, being revolved, presents the boot to the action of the fitting, smoothing, and finishing rolls, which are arranged to yield in conforming to the surface of the boot-tree, and yet maintain a constant pressure thereon, and which traverse sufficiently to thoroughly roll down, smooth, and finish all portions of the boot from the sole to the knee.

While the rolling is progressing the operator can be preparing another boot by adjusting it upon one of the horizontal trees and by applying any suitable composition required.

It may be desirable, in order that no inequalities may exist upon the surface of the boot, to provide the boot-tree with a recess, $m$, upon either side thereof, into which is fitted the metal piece $m'$, which is shaped to receive the side seam of the boot, is provided with a slight lateral play in the recess $m$, and is adapted to lap slightly upon the surface of the boot-tree to provide a uniform surface.

When the boot is adjusted upon the boot-tree the side seams are upon a line with the groove in the pieces $m'$, and the abutting edges of the leather are pressed therein, thereby preventing any inequality upon the surface of the boot-tree and the side seams from becoming displaced.

In lieu of the rolls B C, I can use pads, rub-sticks, or any other suitable tool for smoothing and finishing the boot.

The boot-trees, of course, are constructed so as to be separated for the purpose of stretching the boot-leg, and I prefer to use for this purpose the boot-tree and means for separating it described in the patent granted me on the 20th day of May, 1879.

The boot-tree may be provided with a traversing movement in relation to the rolls, in lieu of or in addition to the traversing movement now given them; and, as an equivalent of the revolving tree and rolls having the movement described, I may use a stationary tree and move the rolls around it, or may move both the tree and the rolls.

Figure 13:
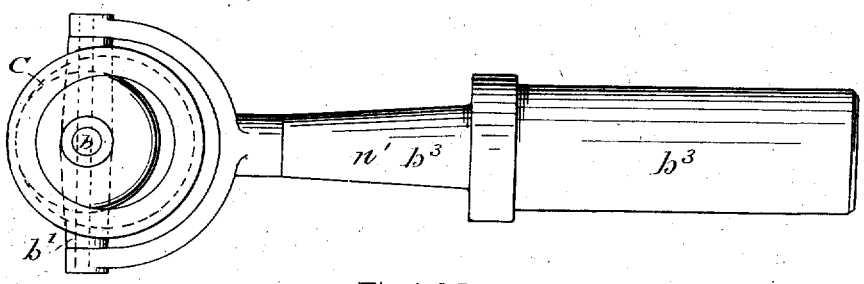

When compressed air is used as a spring to maintain the contact of the rolls or other tool with the tree, I prefer to use the construction shown in Figs. 12 and 13, in which case the rod-supporting blocks $b^3$ are cylinders, into which the compressed air is introduced behind the piston $n$ on the roll-supporting rod $b^2$. Each cylinder should be provided with an extension, $n'$, of sufficient length to furnish a proper bearing for the roll-carrying rod.

Having thus fully described my invention, I claim and desire to secure by Letters Patent of the United States—

1. In a boot treeing and finishing machine, the combination of a revolving boot-tree with one or more series of rolls provided with a yielding movement, and adapted to fit the boot-leg, in sections, to the boot-tree by the movement of the boot-tree in relation thereto, substantially as and for the purposes described.

2. In a boot treeing and finishing machine, the combination of a boot-tree revolved upon its longitudinal axis and a series of rolls held against the boot-tree with a constant pressure, adapted to conform to the varying curvatures thereof, and provided with a traversing movement, whereby the boot-leg is fitted to the boot-tree by the revolution of the boot-tree in relation to the smoothing and finishing devices, and by the traversing movement of said devices, all substantially as described.

3. In a boot-treeing machine, the combination of a revolving boot-tree, a series of rolls adapted to bear upon the leg portion with constant pressure, and a series of rolls adapted to bear upon the foot portion of the boot-tree with constant pressure, and held in supports provided with predetermined movements, substantially as and for the purposes described.

4. In a boot-treeing machine, the combination of one or more rolls adapted to operate upon the foot portion of the boot-tree, and a cam or pattern for adjusting the position of said roll or other smoothing and finishing device or its holder in relation to the said foot portion of the tree, as described, and a revolving boot-tree.

5. In a boot treeing and finishing machine, the combination of one or more rolls adapted to operate upon the foot portion of a boot-tree, the cam or pattern for adjusting the position of the said roll and its supporting-block in relation to the said foot portion of the boot-tree, and means for providing said roll or tool with a slight vertical movement, all substantially as described.

6. In a boot treeing and finishing machine, the combination of a boot-tree arranged to be revolved during the treeing operation with a support, F, adapted to revolve with said boot-tree, and provided with a vertical movement in relation to the same, all substantially as and for the purposes described.

7. As a means for adjusting the position of the block or other device supporting the rod carrying the smoothing and finishing tool, the arm $c$, pivoted to the end of the link $c^4$, and provided with the cam-pins $c^5$, the link $c'$, pivoted to the block $C'$, and a cam, $c^6$.

8. In a machine for treeing and finishing boots, as a means for adjusting the position of the block or other device supporting the smoothing and finishing tool, the pattern-cam arranged below the boot-tree and suitable connecting mechanism.

9. In a boot treeing and finishing machine, the combination of the cams $c^6$ $c^7$, the arms $c$, each of which is provided with two cam-pins, and each of which is connected to the block $C'$ by a link, the holding block or cylinder $b^3$, and the smoothing and finishing tools C, all arranged to operate substantially as described.

10. The combination of the boot-tree provided with the gear-wheel $a^3$, gear-wheels $d^4$ $d^5$, and mechanism for disengaging the gear-wheel $d^5$ from the other gears, substantially as described.

11. A boot-tree provided with longitudinal recesses upon its sides for the reception of the inwardly-projecting portions of the side seams of a boot.

12. In a machine for treeing boots, a finishing device consisting of two rolls having a loose bearing upon their journals, and provided with an oscillating movement upon a center midway between them, substantially as and for the purpose described.

13. In a machine for treeing boots, a jack for supporting two or more boot-trees, arranged to be revolved on a horizontal axis and adapted to present the tree in a vertical position to the action of the treeing devices, substantially as described.

14. In a machine for treeing boots, the combination of a jack for supporting two or more boot-trees, arranged to be revolved on a horizontal axis and adapted to present the tree in a vertical position to the action of the treeing devices, and a device for locking said jack during the operation of the smoothing and finishing device, substantially as described.

15. In a machine for treeing boots, the combination of a jack for holding and presenting a boot-tree to the smoothing and finishing devices, a boot-tree, and a gear-wheel, $a^3$, with means for connecting and disconnecting said gear-wheel with the mechanism for revolving it, substantially as and for the purposes described.

16. In a machine for treeing boots, the combination of a jack, adapted to support two or more boot-trees and to present them to the smoothing and finishing device, with two or more boot-trees, adapted to be successively revolved in the jack by the same automatic mechanism, substantially as described.

J. E. CRISP.

Witnesses:
F. F. RAYMOND, 2d,
A. J. OETTINGER.